United States Patent [19]

Dillon

[11] 4,258,814

[45] Mar. 31, 1981

[54] WEIGHING APPARATUS

[75] Inventor: Benny N. Dillon, Worthington, Ohio

[73] Assignee: Masstron Scale, Inc., Columbus, Ohio

[21] Appl. No.: 51,841

[22] Filed: Jun. 25, 1979

[51] Int. Cl.³ .................. G01G 21/00; G01G 3/14
[52] U.S. Cl. .................................. 177/126; 177/211
[58] Field of Search ........................... 177/126, 211

[56] References Cited

U.S. PATENT DOCUMENTS

| 3,103,984 | 9/1963 | Ellis et al. | 177/211 |
| 3,258,078 | 6/1966 | Crone et al. | 177/211 |
| 3,474,875 | 10/1969 | Laimins | 177/211 X |
| 3,935,914 | 2/1976 | Nordstrom et al. | 177/211 X |
| 3,949,603 | 4/1976 | Laimins | 177/211 X |

*Primary Examiner*—George H. Miller, Jr.
*Attorney, Agent, or Firm*—Yount & Tarolli

[57] ABSTRACT

A portable low profile floor-mounted weighing device including a ramp to gain access to the weighing platform. The weight is sensed by a shear beam load cell that is attached to a vertical frame part by at least one fastener transverse to the direction of application of the load and transverse to the direction of the resisting force.

10 Claims, 5 Drawing Figures

WEIGHING APPARATUS

BACKGROUND

The present invention relates to a portable weighing apparatus, and particularly a portable weighing apparatus adapted to be placed on the floor of a plant for purposes of weighing loads carried by forklift trucks and the like. Such weighing devices are commonly referred to as floor-mounted weighing devices.

Floor-mounted weighing devices are well known. Such devices rest on the floor in a plant or the like and include a weigh platform onto which a vehicle may be driven. A ramp is provided to drive the vehicle onto the load platform of the weighing apparatus. Such devices are portable, and accordingly may be moved from place to place.

In view of the fact that such floor-mounted weighing apparatus involves driving a vehicle onto the apparatus, it is desirable to maintain the height of the apparatus as small as possible. By minimizing the height of the weighing apparatus, the dangers which accompany the possibility of a forklift truck or the like tipping over are minimized. Also, the lower the height of the apparatus, the less material necessary for forming the parts thereof. Moreover, the length of the ramp for driving the vehicle onto the apparatus may be reduced. Thus, of course, the floor space necessary for the ramp is minimized by minimizing the height of the scale.

Known floor-mounted scales of the portable type utilize both shear beam load cells, as well as the axial type load cells, for supporting the load and providing an electrical signal indicating the weight of the load. Common axial load cells have a substantial amount of height in excess of a shear beam load cell for carrying equivalent weights. Accordingly, shear beam load cells have been utilized in floor scales in order to minimize the axial height of the scale. However, there is one known scale utilizing an axial type load cell of special construction which provides a relatively low weighing apparatus.

SUMMARY OF THE PRESENT INVENTION

The present invention is directed to a weighing apparatus which uses shear beam load cells, and particularly to a floor-mounted portable scale of a height substantially less than known floor-mounted scales utilizing shear beam load cells.

The present invention, in essence, includes a horizontally extending platform for receiving a load to be weighed. At least one shear beam load cell supports the platform. The load cell is secured to the platform by at least one fastener and is supported by a support surface, such as the floor.

The load force is transmitted from the platform through the fastener, which secures one end of the shear beam load cell to the platform, through the load cell to a mechanism which supports the load cell at its other end on the support surface. A load placed on the platform results in deflection of the shear beam load cell. The deflection of the shear beam load cell results in an electrical signal being created in proportion to the amount of deflection of the shear beam load cell. The amount of deflection of the shear beam load cell gives an indication of the amount of weight carried on the platform.

In accordance with the present invention, the shear beam load cell is mounted on the platform in such a manner that the overall height of the weighing apparatus is substantially minimized as compared to other weighing devices utilizing shear beam load cells. Specifically, in accordance with the present invention, the shear beam load cells are secured at their one end to a vertically extending surface connected with the platform.

The shear beam load cell specifically is secured to the platform by at least one bolt which extends transverse to the direction of application of the load to the cell, and transverse to the direction of application of the resisting force applied to the load cell by the support surface.

The construction of the present invention must be contrasted to the prior art in which a shear beam load cell is secured to a support structure by a bolt which extends in a direction parallel to the direction of application of the load to the load cell and parallel to the direction the resisting force is applied to the load cell by the support surface. These prior scales utilizing bolts which extend parallel to the direction of application of the load and to the direction of application of the resisting force to the shear beam load cell necessitate a substantial thickness of the platform which receives the load. This is due to the fact that the bolts which secure one end of the shear beam load cell to the platform must be torqued sufficiently to carry the load applied to the bolts from the platform. This results, of necessity, in a substantial amount of thread engagement between the bolts and the platform, particularly for apparatus for weighing substantial loads. As a result, the weigh platforms have had to be relatively thick in order to provide the sufficient threaded engagement with the bolts.

As a result of the present invention, a substantial reduction in the overall height of a weighing apparatus using shear beam load cells can be achieved. In fact, in some instances, the reduction has been 40–45% of the height of the known prior art devices utilizing shear beam load cells.

DESCRIPTION OF THE DRAWINGS

Further objects and features of the present invention will be apparent to those skilled in the art to which it relates from the following detailed description of a preferred embodiment of the present invention made with reference to the accompanying drawings, and in which.

DESCRIPTION OF THE PREFERRED EMBODIMENTS

As noted hereinabove, the present invention relates to a weighing apparatus, and particularly a floor-mounted weighing apparatus for weighing loads carried by forklift trucks and the like. In particular, the present apparatus relates to a floor-mounted weighing apparatus utilizing shear beam load cells for detecting the weight of a load carried on a forklift truck or the like. The present invention is particularly directed to a weighing apparatus using shear beam load cells and where the overall height of the apparatus is substantially minimized compared to known weighing scales utilizing shear beam load cells.

Figures 1, 3:
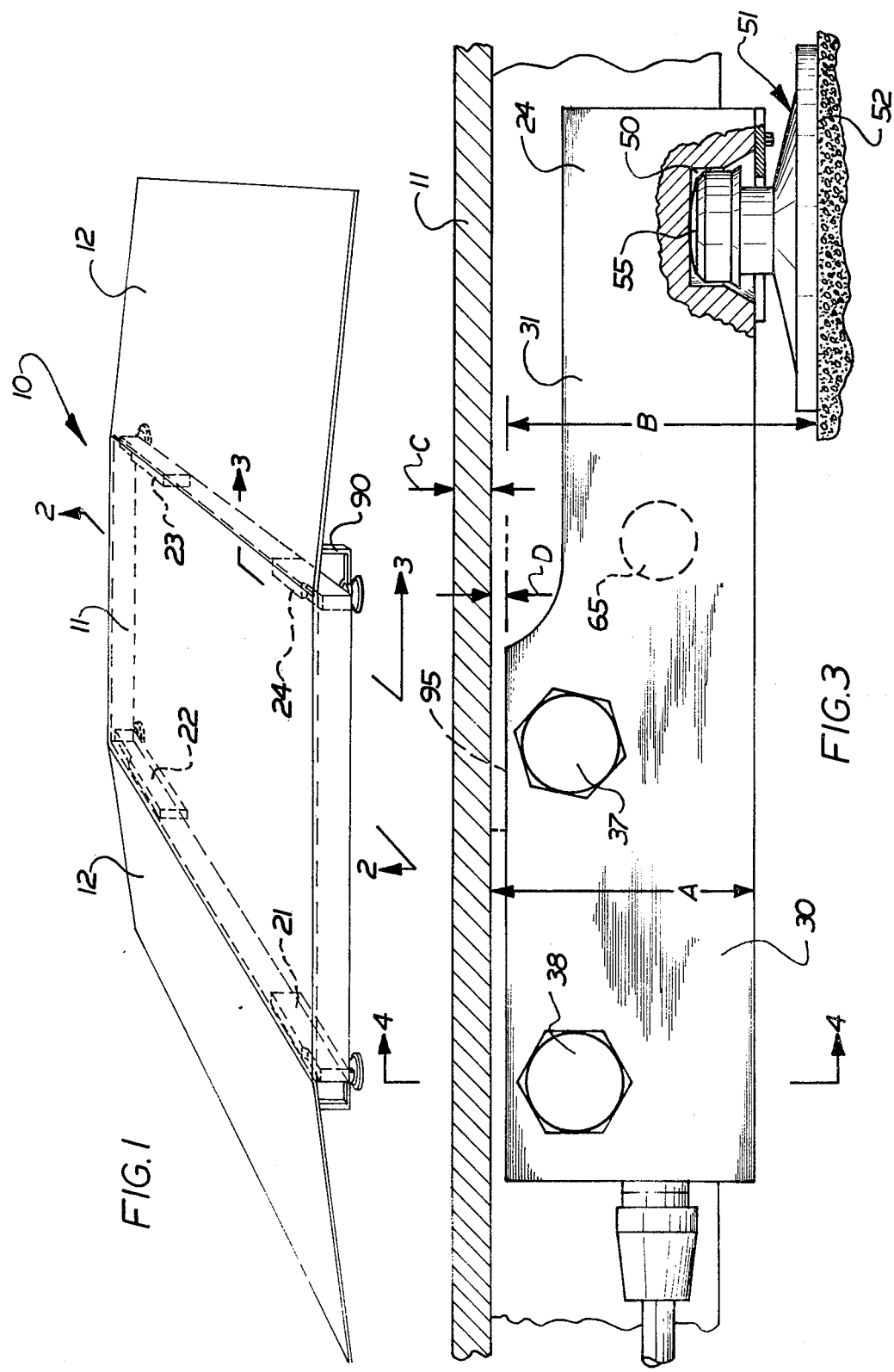
FIG. 1 is a schematic perspective view showing a portable floor-mounted scale of the present invention.
FIG. 3 is an enlarged view of one of the load cells utilized in the scale of FIG. 1, taken approximately along the lines 3—3 of FIG. 1.

As representative of a preferred embodiment of the present invention, FIG. 1 illustrates a weighing scale 10. The weighing scale 10 is a portale floor-mounted scale. The scale 10 sits on the floor of the plant in which the scale is utilized. The scale 10 is portable in the sense that it may be moved relatively easily through the use of mechanical lifting devices for purposes of moving the scale from location to location within the plant or facility in which the scale is used.

The scale 10 includes a horizontally extending platform 11 for receiving the load. The platform 11 may be large enough to receive a vehicle which is to be weighed by the weigh scale 10. The vehicle is moved onto the platform 11 by moving up and down ramps 12 which are provided for purposes of enabling the vehicle to drive onto the platform. As noted hereinabove, the scale of the present invention is constructed so that the scale is of minimum height. This, of course, minimizes the weight of the scale and simplifies the construction of the scale. Also, the minimum height provides a safety factor in that the forklift truck operator is raised a minimum distance off the floor. This minimizes the danger in the event of tipping of the vehicle. Further, since the scale is relatively low, the amount of floor space necessary for the ramps 12 is minimized.

Figure 2:
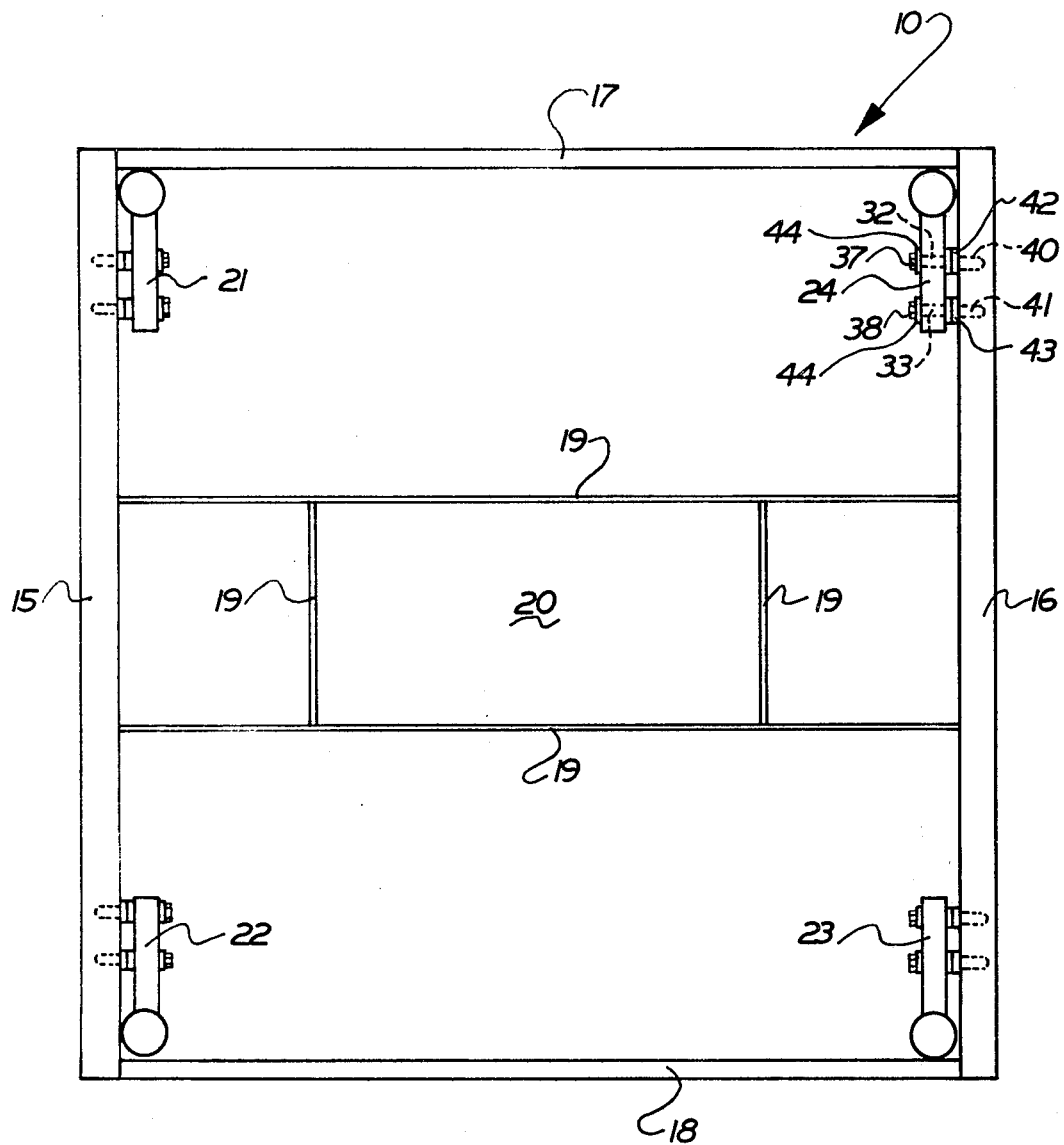
FIG. 2 is a bottom plan view of the scale of FIG. 1, looking at the scale of FIG. 1 in the direction indicated by the lines 2—2.
Figure 4:
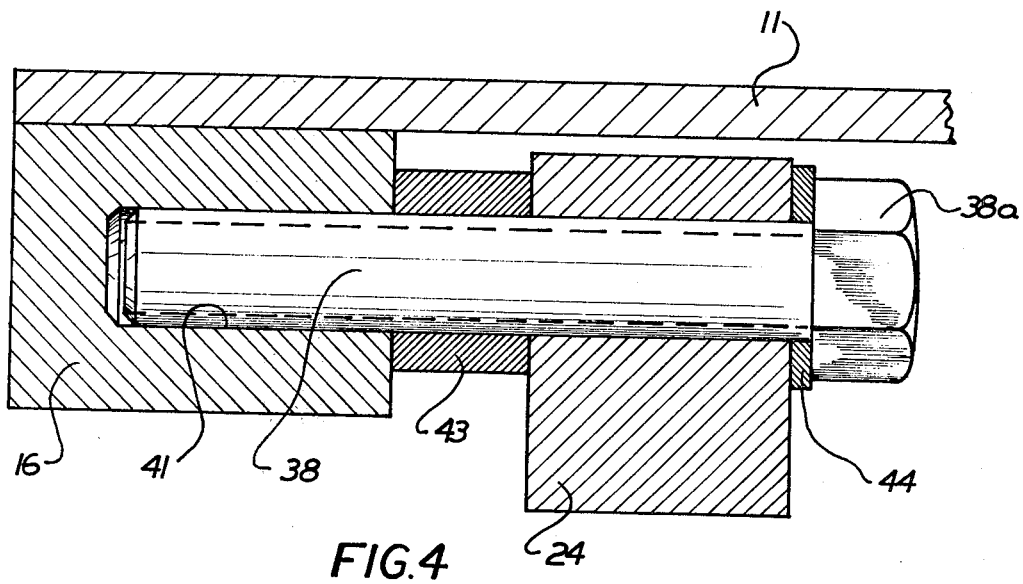
FIG. 4 is a sectional view taken along the lines 4—4 of FIG. 3.

In particular, the horizontally extending platform 11 has at its opposite sides, as shown in FIG. 2, a pair of frame members or projections 15 and 16 which extend parallel to each other adjacent opposite sides of the platform 11. Other frame members 17 and 18 also extend parallel to each other and perpendicular to the frame members 15 and 16. The frame members 15, 16 and 17, 18 all project vertically from the platform 11. The frame members 17 and 18, as shown in FIG. 2, are somewhat smaller in thickness than frame members 15 and 16. The reason for such will become apparent hereinbelow. Also, as best shown in FIG. 2, a series of rib members 19 are provided on the underside of the support platform 11. These ribs 19 also project downwardly. The central area of these rib members defines a chamber, generally designated 20 in FIG. 2. This chamber is to receive electronic circuitry for determining the weight of the load applied to the platform 11, as will be apparent hereinbelow.

A plurality of shear beam load cells are secured to the platform 11. The shear beam load cells are located at each of four corners of the platform and are designated 21, 22, 23 and 24. All of the shear beam load cells are of identical construction. Accordingly, only one will be described in detail hereinbelow. In particular, the shear beam load cell 24 will be described hereinbelow.

Shear beam load cell 24 is shown in an enlarged view in FIG. 2. It should be apparent that all of the shear beam load cells are of identical construction and are supplied by Hottinger, Baldwin Measurements, Inc., Natick Massachusetts. The shear beam load cell 24 includes a base part 30. The base part 30 has a vertical height, designated A in FIG. 3. Projecting outwardly from the base part 30 is a beam portion of the load cell designated 31. The base part 30 of the load cell has a pair of holes 32, 33 extending therethrough.

The load cell is secured to the platform by a pair of bolts 37, 38. The bolts 37, 38 have heads 37a, 38a which clamp the load cell against the side frame 16. The bolts 37, 38 extend through the holes 32, 33, respectively, and are threaded into tapped holes 40, 41, respectively, in the frame member 16; thus, the reason for the thickness of the side frame 16. Flat washers or spacers, 42, 43, respectively, are positioned between the load cell and the frame member 16 and encircle the bolts 37, 38, respectively. Also, washers 44 are located between the head of the bolts 37, 38 and the shear beam load cell. The spacers 42, 43 and washers 44 (both of which are hardened steel) minimize friction and enable the load cell to deflect from an unloaded condition and return to the unloaded condition without frictional forces becoming a detrimental factor in the weight measurement.

The beam portion 31 of the shear beam load cell 24 has a recess 50 at its end. The recess 50 receives the end of a pin 51. The pin 51 has a support surface 52 which is adapted to engage a support surface for the scale. In this case, the support surface for the scale would be the floor of the facility in which the scale is used. Of course, the support surface for the scale could be a base or frame member which supports the scale.

The pin 51 is referred to as a "floating" pin. This is because the surface 52 is a flat surface and upon expansion or contraction of the metal platform 11, due to temperature changes, the support surface 52 will slide relative to the support surface it engages. Thus, the scale is permitted to "grow" and no stresses occur in the parts of the frame which could have a detrimental effect on weight readings.

Further, the pin 51, at its upper end which is engaged in the recess 50, has a spherical surface 55. The spherical surface enable a pivoting action to occur between the pin 51 and the load cell 24. This enables the pin to pivot and seek out a location which would enable the platform 11 to extend horizontally in a level manner, even though the support surface on which the various pins 51 engage is not necessarily flat and/or level.

Figure 5:
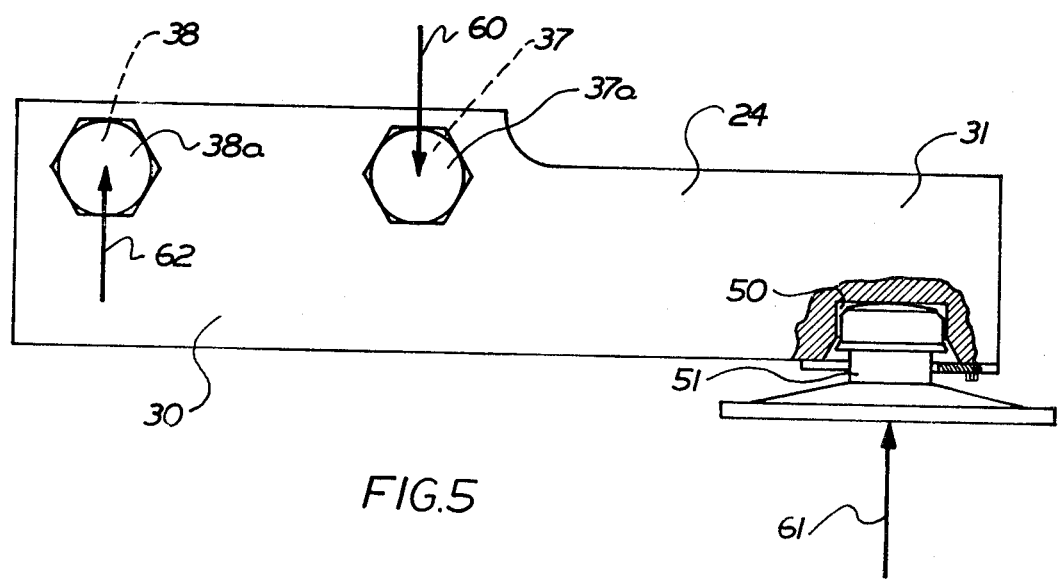
FIG. 5 is a schematic view illustrating the force application to a load cell used in the present invention.

It should be noted from the description hereinabove that the load which is applied to the platform is distributed to the various load cells 21, 22, 23 and 24. Each load cell experiences a proportion of the load. The forces applied to the shear beam load cell 24 are illustrated in FIG. 5. The load force on the platform acts on the screw 37 located centrally of the load cell. This force is designated 60 on the drawings. A resisting force acts on the load cell through the pin 51. This resisting force is designated 61 in FIG. 5. The resisting force 61, of course, is a moment force acting to pivot the load cell 24 about the axis of the bolt 37. That moment force is resisted by a force designated 62 which acts on the bolt 38. The force 62 is a moment force which counteracts the moment force 61 so that the shear beam load cell does not pivot relative to the bolt 37.

Obviously, the forces 60, 61, 62 are applied to the shear beam load cell 24 in a direction transverse to the extent of the bolts 37, 38. Further, the forces 61, 62 are applied to the shear beam load cell 24 in a direction parallel to and opposite the direction the force 60 is applied.

The forces as applied result in a deflection of the shear beam load cell and that deflection creates an electrical signal which is proportional to the amount of the deflection, as is known. Specifically, each shear beam load cell has means for creating an electrical signal in proportion to the deflection. Such means is designated 65 in FIG. 3 and shown schematically. The electrical signals from the various load cells are combined by the electronics located in chamber 20, which are conventional. A readout of the weight of the load on the platform 11 is provided by summing the loads on all of the load cells and providing an output signal to a suitable indicator. The electrical conduits and electronics are not shown, nor will be described, since they are conventional.

It should be apparent from the above that the load cells 21-24 are secured to the sideframes 15, 16 by screws. As a result, the platform 11 which receives the load can be made relatively thin, as compared to known weigh scales where the shear beam load cells are bolted directly into the platform by bolts which extend parallel to the direction of application of the load to the load cell. The securing of a shear beam load cell to a platform by bolts which extend in the direction of application of the load to the load cell is the conventional way by which shear beam load cells have been secured to platforms. Never before, insofar as applicant knows, have shear beam load cells been secured in the manner disclosed herein where the bolts extend transverse to the direction of application of the load to the shear beam load cell and to the direction of application of the resisting force to the shear beam load cell. This has enabled a substantial lessening in the height of a scale utilizing shear beam load cells.

Accordingly, the height of the scale 10 is substantially the overall height of the pin 51 and load cell 24, designated B in FIG. 3, plus the thickness of the platform 11, designated C in FIG. 3. While the drawings illustrate a distance D between the lower surface of the platform and the upper surface of the load cell, such is quite small and could be totally eliminated.

Since the scale 10 weighs vehicles which are driven onto the scale, some stabilization of the scale 10 may be necessary. Such stabilization can be achieved by providing projections 90 on the ramps 12, which projections extend on opposite sides of the pins 51. These projections will function as bumpers to prevent lateral shifting of the scale 10 and also prevent shifting of the scale in the direction of travel of the vehicle onto the scale.

It has been found that for certain applications, it is beneficial that a shim be inserted between the platform 11 and each of the load cells. Such a shim has been found to minimize hysteresis in the load cells. Such a shim is illustrated in dotted lines in FIG. 3 and designated 95.

Further, applicant would like to reference copending application Ser. No. 42,352, filed on May 25, 1979 in the name of William C. Susor, which application is assigned to the assignee of the present invention. The aforementioned application of Mr. Susor discloses a scale which utilizes a shear beam load cell with a pin construction similar to the pin construction disclosed herein. The pin construction disclosed herein is the invention of Mr. Susor. The disclosure thereof herein is merely for purposes of meeting the best mode requirements of the Patent Statutes.

Having described my invention, I claim:

1. Apparatus for weighing a load comprising a horizontally extending platform for receiving the load, said platform having a plurality of corners and vertically downwardly extending frame parts projecting from said platform at least adjacent said corners, shear beam load cells for supporting said platform, one and only one shear beam load cell being located at each of said plurality of corners of said platform and applying a load resisting force thereto, means for securing each said shear beam load cell at one end to a vertically extending frame part and means at the other end of each said shear beam load cell for supporting said load cell on a support surface, said means for securing each said shear beam load cell at said one end comprising at least one fastener which extends transverse to the direction of application of the load to the load cell and transverse to the direction of the resisting force applied to the load cell.

2. An apparatus for weighing a load as defined in claim 1 wherein a shim is located between said platform and each load cell and engages both to transmit force therebetween.

3. An apparatus for weighing a load as defined in claim 1 wherein the vertical height of the apparatus is substantially equal to the combined height of the pin and one shear beam load cell plus the thickness of the platform.

4. An apparatus for weighing a load as defined in claim 1 wherein a plurality of fasteners each secures said load cell to said frame part, said plurality of fasteners comprising bolts which extend through parallel extending passages in the load cell and which are screwed into tapped openings in said frame part.

5. An apparatus for weighing a load as defined in claim 4 wherein washers are provided encircling each of the bolts and located between each said load cell and the frame part to which the load cell is attached and located between the head of said bolts and said load cell.

6. Apparatus for weighing a load comprising a horizontally extending platform having a plurality of corners, at least one vertically extending part projecting from said platform at each of said plurality of corners, shear beam load cells for supporting said platform and applying a load resisting force thereto, one and only one shear beam load cell being located at each of said plurality of corners, means intermediate the ends of each said shear beam load cell for securing each said shear beam load cell to said vertically extending part, means at one end of each shear beam load cell for supporting said load cell on a support surface and through which said load resisting force is applied to the shear beam load cells creating a first moment force acting about said means intermediate the ends of each said load cell, means at the other end of each said load cell providing a second moment force acting about said means intermediate the ends of said load cell opposing said first moment force, said means intermediate the sides of each said shear beam load cell comprising at least one fastener which extends transverse to the direction of application of the load to the load cell and transverse to the direction of the resisting force applied to the load cell.

7. Apparatus as defined in claim 6 wherein said means at the other end of each said load cell comprises a second fastener which extends transverse to the direction of application of the load to the load cell and transverse to the resisting force applied to the load cell and which secures said other end of each load cell to said vertically extending frame part.

8. Apparatus as defined in claim 7 wherein each of said fasteners comprise bolts threaded into tapped openings in said part, and wherein washers are provided between each load cell and said part encircling said bolts and other washers are provided between the heads of the respective bolts and the load cell encircling said bolts.

9. Apparatus for weighing a load comprising a horizontally extending member for receiving the load, said member having a plurality of corners and downwardly extending portions, shear beam load cells for supporting said member and applying a load resisting force thereto, one and only one shear beam load cell being located at each of said plurality of corners, means for securing one end of each said shear beam load cell to said downwardly extending portion and means at the other end of each shear beam load cell for supporting said load cell on a support surface, said means for securing each said shear beam load cell at said one end comprising at least one fastener which extends transverse to the direction of application of the load to each load cell and transverse to the direction of the resisting force applied to each load cell.

10. An apparatus for weighing a load as defined in claim 9 wherein a plurality of fasteners secures each said load cell to said portion, said plurality of fasteners comprising bolts which extend through parallel extending passages in each load cell and which are screwed into tapped openings in said portion.

\* \* \* \* \*

UNITED STATES PATENT AND TRADEMARK OFFICE
CERTIFICATE OF CORRECTION

PATENT NO. : 4,258,814
DATED : March 31, 1981
INVENTOR(S) : Benny D. Dillon

It is certified that error appears in the above-identified patent and that said Letters Patent are hereby corrected as shown below:

In column 6, line 22, please change "fasteners each secures" to --fasteners secures each--.

Signed and Sealed this

Fourteenth Day of July 1981

[SEAL]

Attest:

*Attesting Officer*

GERALD J. MOSSINGHOFF
*Commissioner of Patents and Trademarks*